June 22, 1965   A. BRUEDER   3,190,206
AIR CONDITIONING SYSTEM FOR AN AUTOMOTIVE VEHICLE
Filed May 22, 1962   2 Sheets-Sheet 1
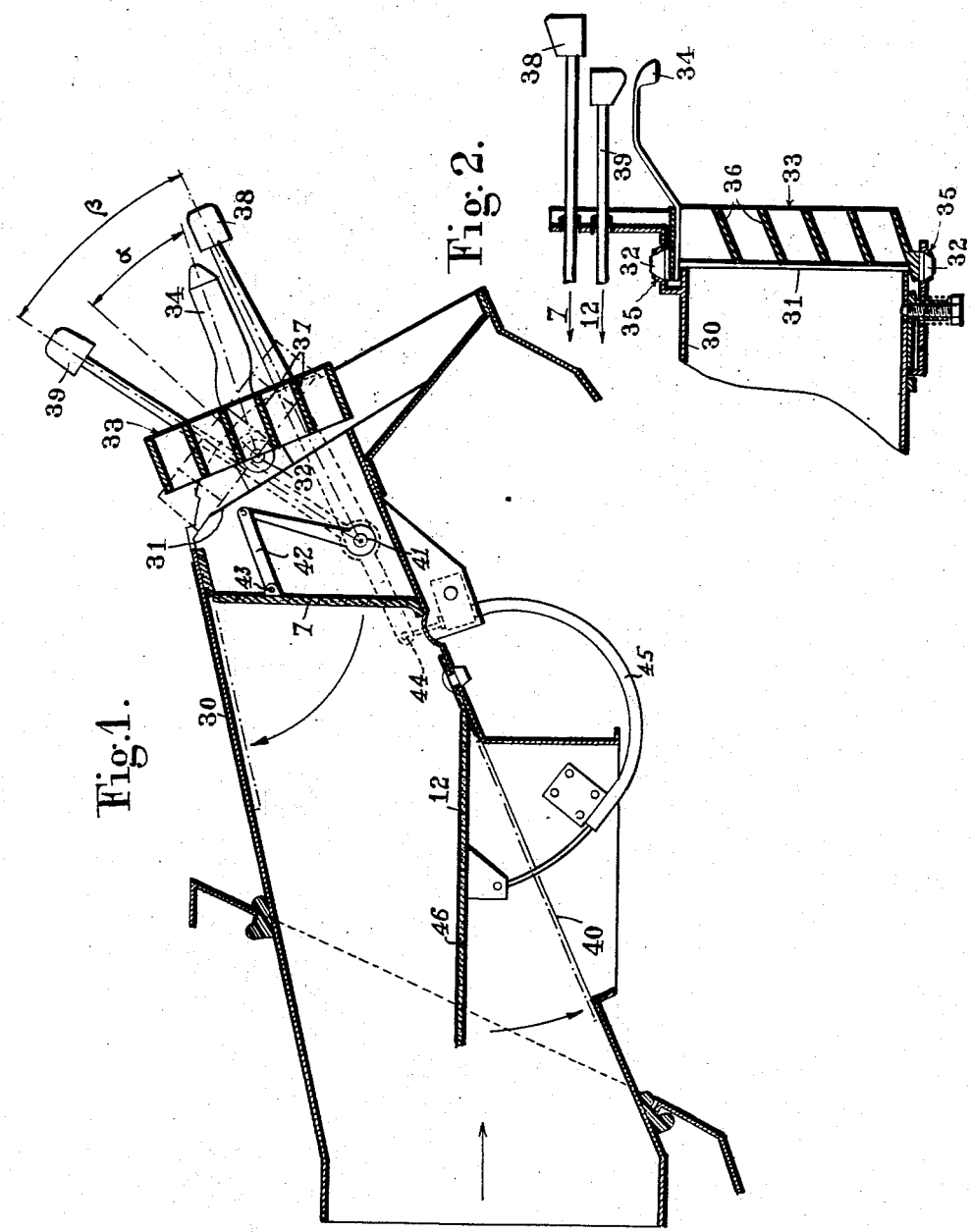

_United States Patent Office_ 3,190,206
Patented June 22, 1965

3,190,206
AIR CONDITIONING SYSTEM FOR AN
AUTOMOTIVE VEHICLE
Antoine Brueder, Paris, France, assignor to Societe
Anonyme Andre Citroen, Paris, France
Filed May 22, 1962, Ser. No. 196,692
Claims priority, application France, May 24, 1961,
862,654, Patent 1,132,271
3 Claims. (Cl. 98—2)

Installations for air-conditioning the interior of automotive vehicles are already known wherein air ducts lead to outlets disposed laterally of the dashboard, and in a zone near the floor, each ventilating aperture being provided with a honeycomb grid in front of which is a deflector pivoting about a horizontal axis, a manual control member permitting the desired adjustment of the air output through the duct.

In air-conditioning systems of this general character, it appeared that the direction of the air output is not positively modified by the deflector, notably when it is desired to protect the passengers' face from draughts. To avoid this inconvenience, this invention provides a pivotal mounting of the aforesaid honeycomb grid about a horizontal axis whereby it is possible, without resorting to any additional deflector or baffle means, and by properly arranging the deflecting blades of the grid, to direct at will the air current according to the grid inclination.

This grid inclination may be controlled by means of a hand lever mounted on, or rigid with one of the pivot pins of the grid, and the flaps or like element adjusting the air output in the ducts leading to the air delivery apertures or vents may be controlled by means of other levers disposed in the vicinity of this hand lever.

In order to afford a clearer understanding of this invention and of the manner in which the same may be carried out in practice, reference will now be made to the accompanying drawing illustrating diagrammatically by way of example a typical embodiment of a ventilating system constructed according to the teachings of this invention. In the drawings:

FIGURE 1 is a vertical section, and FIGURE 2 a horizontal section of the installation.

Figure 3:
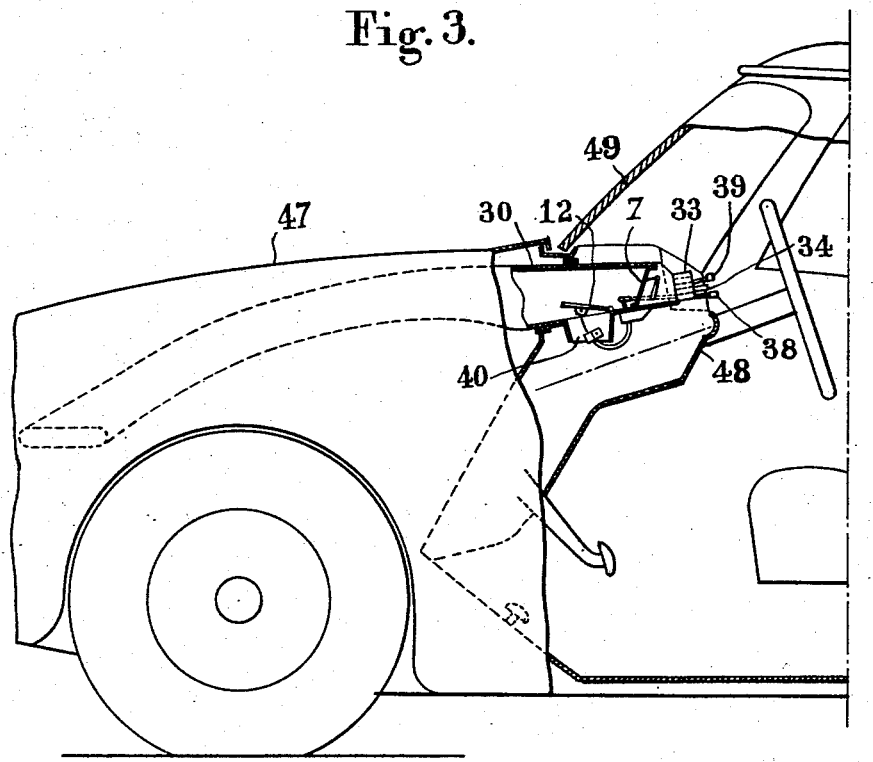
FIGURE 3 is a sectional view of the front portion of the vehicle.

The duct 30 constituting the ventilating passage of the air-conditioning system leads to an outlet or aperture 31 opening into the interior of the vehicle; a honeycomb or like grid 33 is pivotally mounted on horizontal lateral pins 32 in front of the outlet or aperture 31, one of these pivot pins 32 being rigid with a hand lever 34 whereby the complete grid may be pivoted through a relatively wide angle. The ventilation passage 30 is mounted under the hood 47 of the vehicle and opens toward the front, while the grid 33 is located in the instrument panel 48 below the windshield 49.

In the specific form of embodiment illustrated, the grid pivot pins consist of tapered pivots 32 resiliently engaging corresponding recesses 35 formed in the lateral walls of passage 30.

The deflector blades of the grid are arranged for example as a honeycomb, with the vertical blades 36 inclined toward the interior of the vehicle and the horizontal blades 37 directed upwards, whereby in the normal position and in the case of air outlets disposed on the sides of the dashboard, the air is directed upwards and towards the side of the vehicle.

These blades 36, 37 may also be directed otherwise in the grid, according to the purpose contemplated.

The air outlet 31 has mounted therein a pivot pin 41 on which a pair of control levers 38, 39 are pivotally mounted laterally of control lever 34. The control lever 38 actuates through a link 42 the valve 7 on which it is pivoted at 43, and control lever 39 actuates with its extension 44 one end of a cable 45 attached at 46 on valve 12 in order to rotate same. The movement of control lever 39 regulates the air output either through the outlet 31 or through the outlet 40.

Preferably, these levers are mounted relatively close to the hand lever 34, whereby the driver and/or passengers may easily regulate the air outputs from the upper and lower outlets as well as the direction of the air current to the interior of the vehicle.

In the drawing α and β designate the permissible angular movements of levers 34, 38 and 39; the position of lever 38 corresponds to the closed position of flap 7 and the positions of levers 34 and 39 correspond to the maximum ventilation position.

A flexible sheath or bellows (not shown) may be fitted in the aperture 31 around the grid 33 to provide a fluid-tight connection between the edges of this aperture and those of the pivoting grid.

Of course, other modifications and variations may be brought to the single form of embodiment shown and described herein, without departing from the spirit and scope of the invention as set forth in the appended claims.

What I claim is:

1. An automotive vehicle with air-conditioning system comprising an outlet device disposed on each side of the interior of the vehicle and comprising duct passages for delivering fresh air to the interior of the vehicle, a first outlet aperture at the end of each duct about in the upper part of the vehicle, another outlet aperture near said first aperture, a duct disposed between said other aperture and the lower part of the vehicle, a hinged flap mounted in front of each outlet aperture, a pivot pin mounted horizontally in said outlet duct, operating lever means disposed side by side on this pivot pin and controlling said hinged flaps, a honeycomb grid at the outlet duct disposed in front of the flap, deflector blades of said grid so disposed as to direct an air flow towards the side and top of the vehicle's normal position, bearing means rigid with said outlet duct, aligned horizontal pivot pins engaging said bearing means and on which said grid is pivotally mounted, and exterior operating handle means controlling this pivotal arrangement and disposed near said operating levers.

2. Air conditioning system for the interior of an automotive vehicle of the type comprising air delivery ducts opening into the interior and on each side of the vehicle on either side of the windshield and which are provided with hingedly-mounted opening and closing flaps with control hand levers connected to said flaps, which comprises at the end of each duct, downstream of the relevant flap, a honeycomb grid having vertical and horizontal blades with its vertical blades inclined outwards and its horizontal blades inclined upwards and inwards of the vehicle, conical pivots mounted laterally substantially in the central region of said grid for pivoting same, pressed recesses formed in the outlet portion of said duct for receiving said pivots and a control handle solid with one of said pivots and disposed in the vicinity of said flap control hand lever.

3. Air conditioning system as set forth in claim 2, comprising a flexible duct section connecting the edges of said pivoted grid to the edges of the outlet portion of said duct.

References Cited by the Examiner
UNITED STATES PATENTS

| | | | |
|---|---|---|---|
| 2,135,810 | 11/38 | Germonprez | 98—40 |
| 2,755,726 | 7/56 | Little | 98—2.4 |
| 2,963,954 | 12/60 | Baker | 98—2.4 |
| 2,987,981 | 6/61 | Boylen | 98—2.3 |
| 3,118,362 | 1/64 | Suisse | 98—2 |

ROBERT A. O'LEARY, *Primary Examiner.*

MEYER PERLIN, *Examiner.*